US012517871B1

(12) United States Patent
Ben-Hagai

(10) Patent No.: US 12,517,871 B1
(45) Date of Patent: Jan. 6, 2026

(54) LOCKING METADATA OF A FILE SYSTEM ENTITY

(71) Applicant: VAST DATA LTD., Tel Aviv (IL)

(72) Inventor: Ilan Ben-Hagai, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/660,127

(22) Filed: May 9, 2024

(51) Int. Cl.
*G06F 16/00* (2019.01)
*G06F 16/17* (2019.01)
*G06F 16/176* (2019.01)

(52) U.S. Cl.
CPC ...... *G06F 16/1774* (2019.01); *G06F 16/1734* (2019.01)

(58) Field of Classification Search
CPC .................. G06F 16/1734; G06F 16/1774
USPC ........................................................ 707/705
See application file for complete search history.

(56) References Cited

U.S. PATENT DOCUMENTS

| | | | | |
|---|---|---|---|---|
| 12,124,372 B1* | 10/2024 | Ben-Hagai | .......... | G06F 12/0891 |
| 12,189,482 B1* | 1/2025 | Levy | .................. | G06F 11/1423 |
| 12,306,807 B1* | 5/2025 | Ben-Hagai | .......... | G06F 16/1865 |
| 12,379,875 B1* | 8/2025 | Costeff | ................. | G06F 3/0604 |
| 2008/0016076 A1* | 1/2008 | Seeger | .................... | G06F 16/10 |
| 2011/0282850 A1* | 11/2011 | Kamra | ................ | G06F 16/2343 |
| | | | | 707/704 |
| 2013/0144853 A1* | 6/2013 | Kohno | ................ | G06F 16/2343 |
| | | | | 707/704 |
| 2015/0356116 A1* | 12/2015 | Lin | ........................ | G06F 16/184 |
| | | | | 707/613 |
| 2016/0004718 A1* | 1/2016 | Lin | ..................... | G06F 11/1004 |
| | | | | 707/690 |
| 2016/0070741 A1* | 3/2016 | Lin | ....................... | G06F 16/183 |
| | | | | 707/638 |
| 2016/0154817 A1* | 6/2016 | Mason, Jr. | .......... | G06F 16/1827 |
| | | | | 707/704 |
| 2017/0160980 A1* | 6/2017 | Golander | ............ | G06F 16/2308 |
| 2019/0340276 A1* | 11/2019 | Thomsen | ............ | G06F 16/2343 |
| 2020/0073964 A1* | 3/2020 | Levy | ........................ | G06F 16/16 |
| 2020/0225875 A1* | 7/2020 | Oh | ......................... | G06F 3/0614 |
| 2021/0157784 A1* | 5/2021 | Young | ............... | G06F 16/24552 |
| 2021/0365291 A1* | 11/2021 | Saha | ......................... | G06N 5/04 |
| 2021/0382636 A1* | 12/2021 | Perumal | ................ | G06F 3/0622 |
| 2022/0318222 A1* | 10/2022 | Khullar | ................... | G06F 16/23 |
| 2023/0117571 A1* | 4/2023 | Yelin | ..................... | G06F 16/164 |
| | | | | 707/822 |
| 2023/0118947 A1* | 4/2023 | Yelin | ........................ | G06F 16/11 |
| | | | | 707/690 |
| 2023/0222102 A1* | 7/2023 | Michaud | ............... | G06F 16/182 |
| | | | | 707/704 |

(Continued)

*Primary Examiner* — Ann J Lo
*Assistant Examiner* — Rezwanul Mahmood
(74) *Attorney, Agent, or Firm* — Reches Patents

(57) ABSTRACT

A method for locking metadata, the method includes (i) executing a first FSE command, by obtaining a lock of FSE metadata that is related to the FSE and is stored at a remote shared storage unit, and creating and accessing a local version of the FSE metadata; (ii) estimating that a reception of the first FSE command will be followed, within a defined time frame, by a reception of a second FSE command; (iii) maintaining the lock following a completion of the first FSE command; and (iv) executing the second FSE command, following the reception of the second FSE command, wherein the executing of the second FSE command includes accessing the local version of the FSE metadata.

17 Claims, 4 Drawing Sheets

(56) References Cited

U.S. PATENT DOCUMENTS

2024/0248771 A1* 7/2024 Laier ................. G06F 9/528
2024/0405985 A1* 12/2024 Auh .................. H04L 9/0861
2025/0053553 A1* 2/2025 Kondiles ............ G06F 16/2343

* cited by examiner

LOCKING METADATA OF A FILE SYSTEM ENTITY

BACKGROUND

Some filesystem commands received from users of a storage system are commonly received in a certain sequence within a short time period. The sequence of commands follows a specific filesystem command that triggers the sequence. The process that is executed in response to receiving each of these commands includes several operations that are repeated for each of these commands. These repeating operations involve at least: accessing an external shared storage space for locking metadata blocks, reading the metadata from the external storage space, and releasing the lock at the external storage space.

There is a need to prevent the repetition of these operations upon each command of the sequence, and reducing the access to the external storage space.

SUMMARY

There may be provided a method and system for using locking of metadata of a file system entity (FSE) located at an external storage space, in a manner that facilitates reducing the access to the external storage space, upon certain subsequent operations related to the FSE.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

The following description refers to file commands, but may be applicable to commands directed to other filesystem entities (FSEs), such as directory, object, and even to database tables. The following embodiments refer to specific file commands, but the described methods are applicable to any sequence of commands that is expected to be received from a user of the storage system, following a specific received command, that is known as a trigger that may initiate the sequence of commands.

A file creation command received from a user of a storage system is quite often immediately followed by other specific user commands related to the file, for example, set-attributes command for setting access rights and other attributes, and/or writing initial content to the newly created file.

Executing each of these user commands usually involves: locking the file's metadata, reading the content of the metadata into a local memory/cache of the server (also referred to as a compute node), and releasing the lock at the end. For example, when a set-attributes command is received from a user, the following steps are usually performed: lock the file's metadata to block access to the same metadata by other servers, read, from a shared storage device, the metadata (including the attributes) into the local memory of the server, update the metadata in the local memory with the attributes specified in the set-attribute command, write back the metadata into the storage device, and unlock the file's metadata. As for another example: when the initial writing of content (or any other file writing) is performed, the following steps are usually performed with regard to the metadata (besides the writing of the data itself): lock the file's metadata, read one or more of the metadata blocks, use the metadata for determining access rights for the user, write new attributes to the metadata block (e.g., a new update-time and/or access-time, size), and unlock the metadata.

Figure 1:
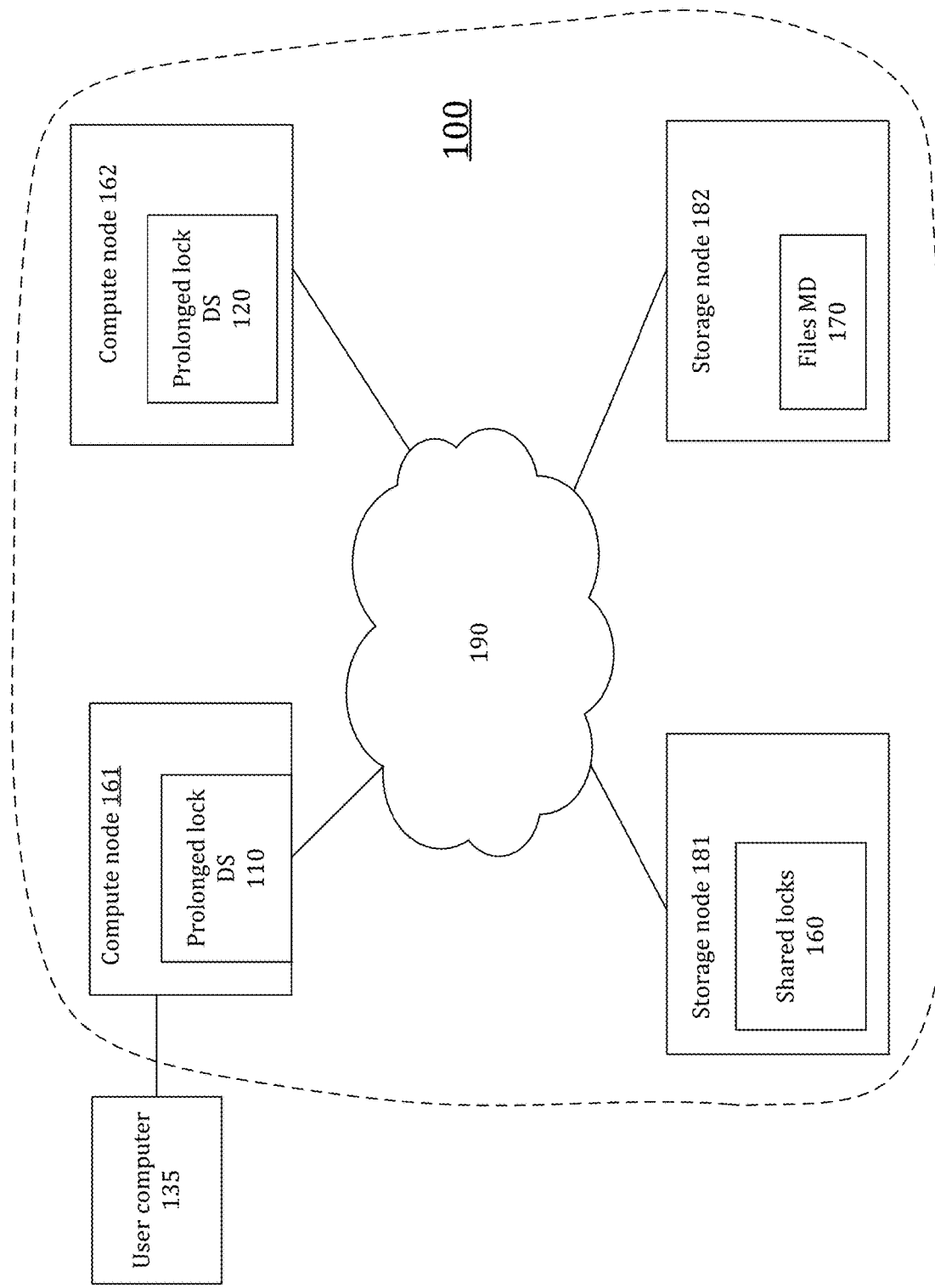
FIG. 1 is an example of a storage system.

Since multiple servers can access the same files, the lock data structure that enables locking is not part of the local memory, and is stored in a shared storage space that is external to the servers, and therefore even the operation of locking requires external access. Therefore, executing any of these user commands (create, set attributes, write) may involve accessing external storage devices for locking, as well as reading metadata into a local memory of the server that handles these commands. In some cases—the storage devices are not directly connected to the server, for example, FIG. 1 illustrates a compute node 161 that handles the users' commands, received from e.g., a user computer 135, and needs to access the shared storage space provided by storage nodes 181, 182, where the locks and the metadata reside. The compute nodes communicate with the storage nodes over a communication network (e.g., fabric 190).

Performance impact of the above operations is quite substantial for certain user applications that send a sequence of commands, including: create, set-attributes, and write, in a large scale.

According to an embodiment of the invention, prolonged locks are deployed for holding acquired locks beyond the time of completion of a certain process that needs the lock, e.g., file creation process, until the expected subsequent user commands are received and handled, or until it is determined that no further commands are expected in the near future. As long as a prolonged lock is held for a certain file, the metadata of the certain file is stored in the local memory of the server, to be used when executing subsequent user commands. The holding (maintaining) of the prolonged lock assures that no other server (e.g., compute node 162) changes the metadata, and therefore the cached metadata is valid, as long as the prolonged lock is held.

The prolonged locks are established when receiving a command that is known as a command that is expected to be followed by a sequence of other commands, for example, at the creation of a file. The prolonged lock is being held for a certain duration after the file creation, to allow reception and handling received commands that might follow the creation. The prolonged locks are not released after completing the handling of the file creation command, but rather released only after all the user operations expected to follow the creation—are completed, or—when it is determined that the time passed since the creation, or since the last command of the expected sequence, exceeded a threshold, or—no other user commands are currently expected. During the time that the prolonged locks are not released, the metadata block is kept in the local memory, and therefore accessing the shared external storage space for reading an updated remote version of the metadata, is avoided.

Thus, the execution of set-attributes and write commands that follow the creation can avoid at least locking, reading metadata, and unlock operations-all require accessing the shared storage space over the network. Therefore, the avoiding results in improving these commands' latency as well as reducing overall workload execution time.

Since the metadata of the file is cached upon the creation, the existence of a prolonged lock associated with the file, upon receiving the subsequent user command, also indicates that the metadata is still in the local memory, valid, and can be used. Therefore, when the set-attributes is received and handled, or when the initial write is received and handled, the steps: lock metadata, read metadata, and unlock—can be avoided.

There is a need to associate the prolonged lock with the process that is currently accessing the metadata being locked, so that a set-attribute process will not interfere with a write process, or two writes will not interfere with each other. Thus, the prolonged lock is associated with the process that is currently executing one of the user commands. Therefore, when a process that starts executing a user command identifies the existence of a prolonged lock—it requests ownership over the existing prolonged lock, for the duration of the process. The ownership capture may use a local lock mechanism.

The process of file creation includes at least the following steps: (i) creating the file's metadata in the storage devices (the metadata initially includes at least the file identifier, e.g., a handle) and caching the file's metadata in the local memory of the server; (ii) acquiring the shared lock associated with the file, in the external shared storage space; (iii) creating, in the local memory a prolonged lock data structure that includes information about the prolonged lock and a reference to the cached metadata. The process of file creation is terminated without releasing the shared lock associated with the file.

The process of set-attributes that follows the file creation, or the process of writing to the file includes: (i) checking whether there is a prolonged lock associated with the file. The checking uses the file's identifier (e.g., handle) for looking up the prolonged lock data structure for existence of an entry associated with the file identifier and includes information related to a prolonged lock. (ii) if a prolonged lock for the file is found—then the process continues without needing to acquire the shared lock of the file and without reading the metadata from the external storage devices. Only obtaining ownership over the prolonged lock is required; (iii) if a prolonged lock for the file is not found—then the process continues with acquiring the shared lock associated with the file, and reading the metadata from the external storage space.

A background process for cleaning inactive prolonged locks, will remove prolonged locks that are inactive for longer than few milliseconds (e.g., 10 milliseconds), for example, either: (i) not being accessed for an idle time period (several milliseconds), or (ii) exist in the local memory for longer than an existence time period (that may be different from the idle time period). The background process scans the prolonged lock data structure and for each record that represents an inactive prolonged lock—it releases the corresponding shared lock in the external storage space and remove the record from the prolonged lock data structure.

The prolonged lock data structure will include a prolonged lock record per each file that is currently under a prolonged lock, where each prolonged lock record includes: (i) a lock owner—the identifier of the process that is currently the ownership of the prolonged lock (or—none); (ii) reference to the locked block(s) that is currently cached in the local memory; (iii) timestamp of the locking time—to allow unlocking if the prolonged locking exceeds a maximum lock period; (iv) timestamp of the last time the block has been used by any of the processes (related to any of the user commands), e.g., the last time the owner of the prolonged lock was changed, to allow keeping hot blocks for longer time.

FIG. 1 illustrates a storage system 100 that includes one or more compute nodes, such as compute nodes 110 and 120 that are coupled to one or more storage nodes 181 and 182. Each compute node may handle prolonged lock data structure 110 or 120, where each prolonged lock is associated with the corresponding metadata of a specific file that is locked by the compute node, using a prolonged lock. Each prolonged lock record is associated with a shared lock in shared locks 160. Before a prolonged lock record is established in the local memory of a compute node for the metadata of a specific file, a shared lock for the metadata of this file is first acquired at the shared locks space in one of the storage nodes. The shared locks are accessible to all the compute nodes, so when the shared lock of the specific file is acquired, e.g., by compute node 161, and then a prolonged lock record is established, no other compute node, e.g., compute node 162, can acquire the lock and use the metadata of the specific file, as long as the prolonged lock exists and maintained by compute node 161. Acquiring a shared lock requires access over a network 190, which is a time-consuming operation, however, in the presence of a prolonged lock, this access is avoided.

Storage system 100 further includes one or more storage nodes that can store files' metadata 170, which is updated upon each operation: file creation, set-attributes and write. However, since the file metadata of a file under prolonged lock is cached, there is no need to read the updated metadata from the storage node. FIG. 1 illustrates files' metadata 170 as being stored in storage node 182 and shared locks 160 as being stored in storage node 181, but these data structures may be stored differently, for example, each of these data structures may be sharded across all the storage nodes of the storage system.

Each of the compute nodes may include one or more processing circuits, that may include a central processing unit (CPU), application-specific integrated circuits (ASICs), field programmable gate arrays (FPGAs), communication controllers, full-custom integrated circuits, etc., or a combination of such integrated circuits.

Figure 2:
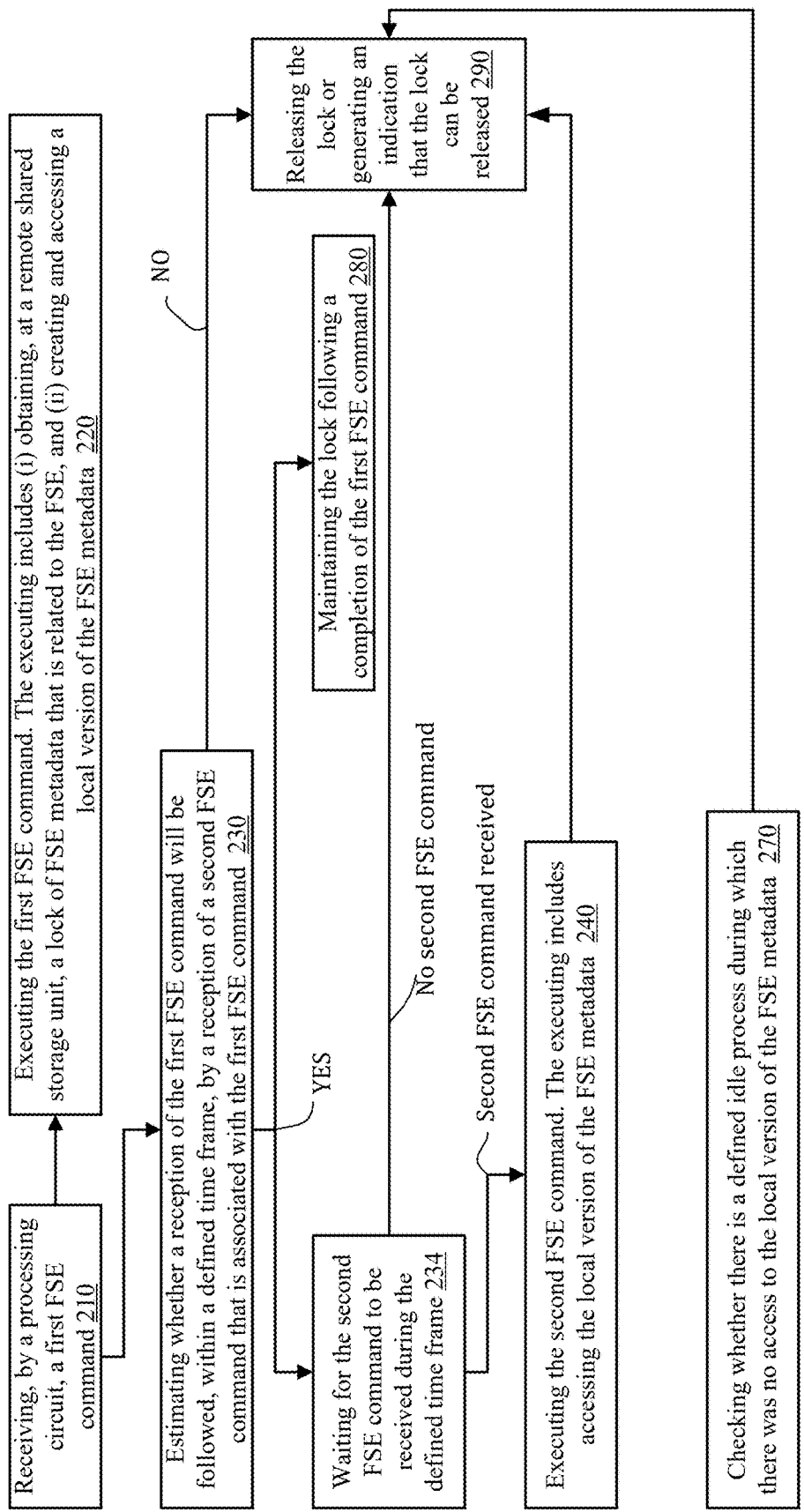
FIG. 2 is an example of a method.

FIG. 2 illustrates an example of a method 200 for locking metadata.

According to an embodiment, method 200 starts by step 210 of receiving, by a processing circuit, a first FSE command.

According to an embodiment, step 210 is followed by steps 220 and 230.

According to an embodiment, step 220 including executing the first FSE command. Step 220 includes (i) obtaining, by the processing circuit, a lock of FSE metadata that is related to the FSE and is stored at a remote shared storage unit (e.g., storage node 181), and (ii) creating and accessing a local version of the FSE metadata. The creating of the local version of the FSE metadata may include either: (a) reading the remote version of the FSE from the remote shared storage unit and caching it in the local storage, or (ii) in a case where there is no remote version, such as upon a file creation command, the initial metadata is created and cached in the local storage. The local version can then be accessed during the current execution of the first FSE command (as well as subsequent commands). Once the lock is obtained, only the compute node that includes the processing circuit can perform operations on the FSE metadata, so no other compute node can update the remote version of the FSE metadata.

According to an embodiment, step 220 is executed by a processing circuit of a compute node of a storage system, and wherein the remote shared storage unit is a storage node of the storage system or part thereof, or a group of storage nodes that stores different parts of the FSE metadata. The first FSE command is received from a user connected to the compute node, and may be identified as a command that can trigger reception of other commands from the user. An example of the first FSE command is a file creation.

According to an embodiment, step 230 includes estimating whether a reception of the first FSE command will be followed, within a defined time frame, by a reception of a second FSE command that is associated with the first FSE command.

According to an embodiment, step 230 is based on monitoring FSE commands—of a certain client, of a certain remote computer, of a communication protocol, of multiple clients, of multiple remote computers, and the like. If it is determined that a certain command, such as the first FSE command is followed by one or more other commands (such as the second FSE command), for over a certain percentage of the monitored cases—then it can be estimated that the reception of the first FSE command will be followed, within the defined time frame, by a reception of a second FSE command. The monitoring may check the commands that follow a certain command during at least the defined time frame. The monitoring may be done per certain client, certain remote computer, per group of clients, etc. The defined time frame may be of few (e.g., 10) milliseconds and up to few dozens of milliseconds. The defined time frame may be on the lower ranges when it is expected that multiple compute nodes can access the same FSE simultaneously, and locking the FSE metadata for a longer time frame (e.g., longer than 10 msecs) can cause blocking of the other compute nodes from accessing the FSE. On the other hand, a longer defined time frame (e.g., 50 msecs) may allow more commands to benefit from the advantage of using the local version of the FSE metadata.

According to an embodiment, when estimating that the second FSE command is not expected to be received during the defined time frame—then step 230 is followed by step 290 of releasing the lock or generating an indication that the lock can be released.

According to an embodiment, when estimating that the second FSE command is expected to be received during the defined time frame then step 230 is followed by steps 234 and 280.

According to an embodiment, step 234 includes waiting for the second FSE command to be received during the defined time frame. The waiting is not necessarily an active waiting, but may include starting a timer, or saving the time of the reception of the first FSE command, so as to detect when the defined time frame elapses. Step 234 and the following step 290 of releasing the lock when the defined time frame is expired—may be performed by a background process that cleans the prolonged (maintained) data structure from non-used locks.

According to an embodiment, step 280 includes maintaining the lock following a completion of the first FSE command. The maintaining includes avoiding releasing the lock when completing the execution of the first FSE command, so that the lock is still active for the benefit of the compute node that includes the processing circuit, to be used when the second FSE command is received.

According to an embodiment, when the second FSE command is not received during the defined time frame—step 234 is followed by step 290.

According to an embodiment, when the second FSE command is received during the defined time frame—step 234 is followed by step 240 of executing the second FSE command. Step 240 includes accessing the local version of the FSE metadata.

Step 240 benefits from the lock imposed on the FSE metadata—as it ensures that the local version of the FSE metadata is accurate, since no other compute node can acquire the lock.

According to an embodiment, step 240 includes avoiding accessing the remote shared storage unit for reading a remote version of the FSE metadata. Accessing the remote shared storage unit for obtaining the lock is also avoided, since the lock is already maintained active.

According to an embodiment, step 240 includes reading a remote version of the FSE metadata stored in the remote shared storage unit instead of the local version of the FSE metadata, when finding that the lock is not maintained. In this case, step 240 also includes accessing the remote shared storage unit for obtaining the lock. The finding of the non-maintained lock may include looking up an identifier of the FSE in a data structure that includes maintained locks (also referred to as prolonged locks) and failing to find an entry associated with the FSE identifier.

According to an embodiment, step 240 is followed by jumping to step 290.

While the previous example referred to a second FSE command that followed the first FSE command, method 200 may be applied, mutatis mutandis to a set of associated FSE commands. Assuming for example that the set includes K additional FSE commands (K being an integer that exceeds one)—then the previously mentioned steps of method 200 are repeated for some or all of the K additional FSE commands—in view of one or more defined times during which the K additional FSE commands are expected to be received.

For example—method 200 may include estimating that the first FSE command will be followed by a reception of additional FSE commands within a defined estimated time period. The additional commands include K additional FSE commands. The defined estimated time period may be equal to the defined time period, shorter or longer than the defined time period.

According to an embodiment, the execution of method 200 under the expectation to receive K additional FSE commands includes releasing the lock following a termination of one or more defined estimated time periods without a reception of all the additional commands, or—a termination of one or more defined estimated time periods whether or not all the additional commands.

According to an embodiment, method 200 includes step 270 of checking whether there is a defined idle period during which there was no access to the local version of the FSE metadata—and if so jumping to step 290. Step 270 imposes a condition that may be applied in parallel to the checking of whether one or more associated FSE commands are received—or may be applied instead of the checking of the whether one or more associated FSE commands are received. Step 270 and the following step 290 of releasing the lock when the defined idle process is expired—may be performed by a background process that cleans the prolonged (maintained) data structure from non-used locks. The access to the local version of the FSE metadata may occur by any of the additional FSE commands (or the second FSE command, which may be included in the additional FSE commands). Jumping to step 290 for releasing the lock may be avoided when the defined time frame is elapsed, but the defined idle process was not elapsed.

Figure 3:
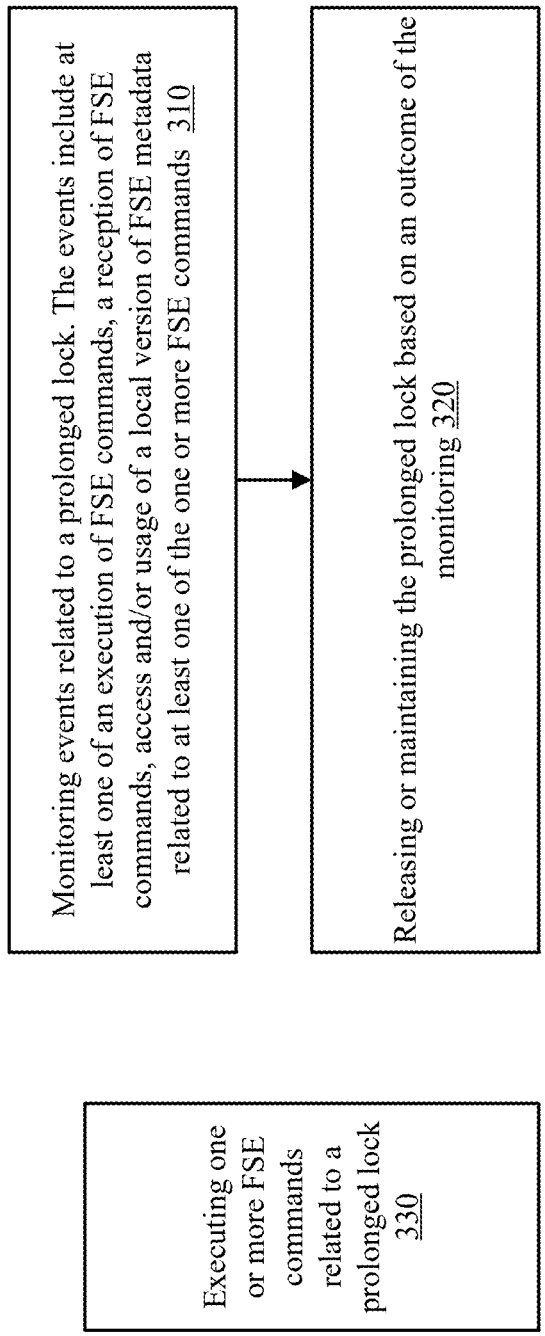
FIG. 3 is an example of a method.

FIG. 3 illustrates an example of a method 300 for locking metadata.

According to an embodiment, method 300 starts by step 310 of monitoring events related to a prolonged lock. The events include at least one of: an execution of FSE commands, a reception of FSE commands, access and/or usage of a local version of FSE metadata related to at least one of the one or more FSE commands.

According to an embodiment, step 310 is followed by step 320 of releasing or maintaining the prolonged lock based on an outcome of the monitoring.

According to an embodiment, method 300 also includes step 330 of executing one or more FSE commands related to a prolonged lock.

Figure 4:
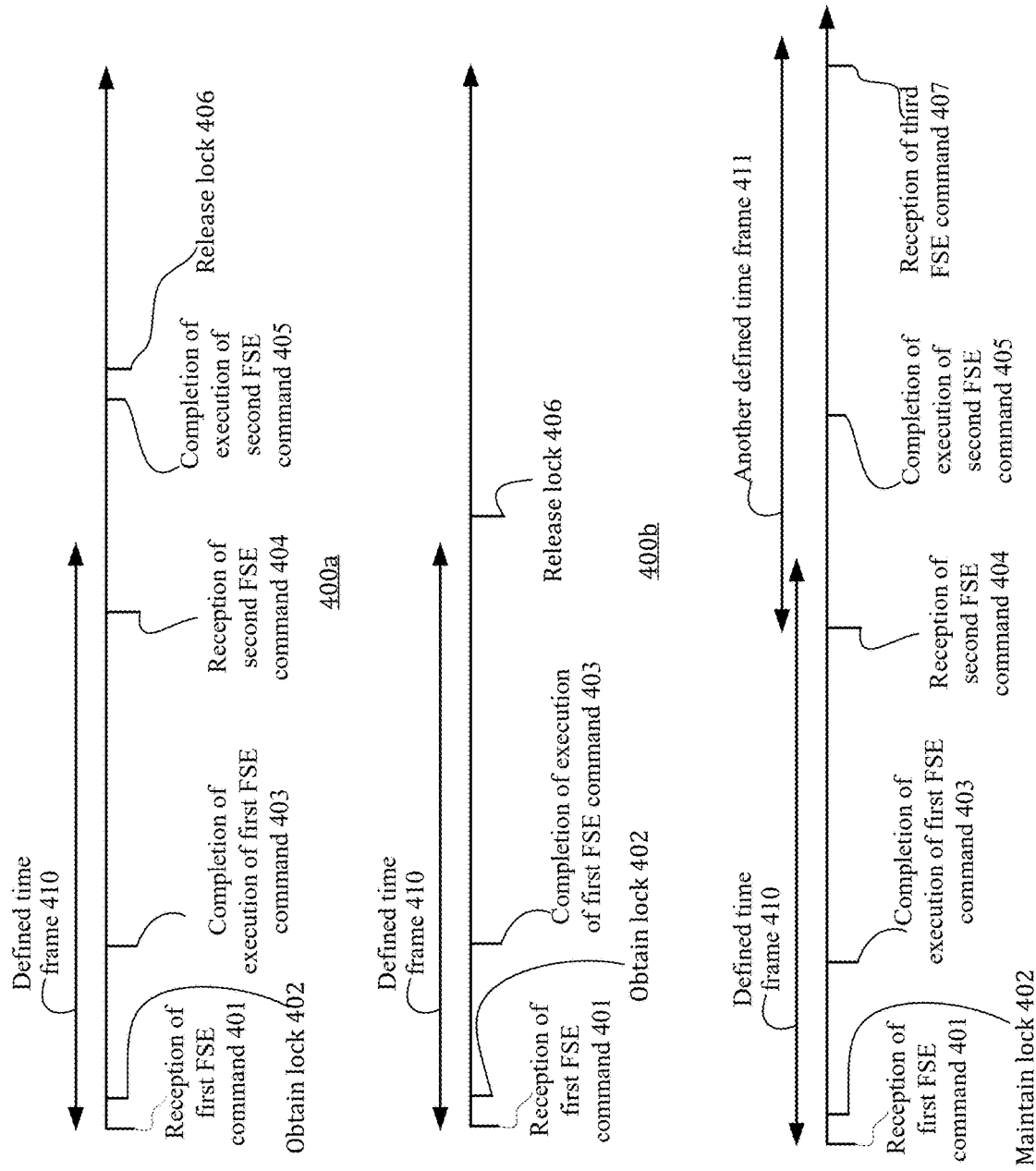
FIG. 4 includes examples of time diagrams.

FIG. 4 illustrates examples of timing diagrams 400*a*, 400*b* and 400*c*.

Timing diagram 400*a* illustrates a reception of first FSE command (time 401) whereas it is assumed that the reception is followed by executing the first FSE command, a defined time frame (410) from the reception of the first FSE command, a completion of the execution of the first FSE command (time 403), a reception of a second FSE command (time 404) before the termination of the defined time frame whereas it is assumed that the reception is followed by executing the second FSE command, a completion of the execution of the second FSE command (time 405), and the release of the lock (time 406). It is noted that the release of the lock is not performed before the completion of the execution of the second FSE command even though the defined time frame was already elapsed. This may be guaranteed by defining the defined idle process which is also measured since the last access to the local FSE metadata, wherein such as access probably occurs during the execution of the second FSE command, and therefore the defined idle process is not elapsed, and the release of the lock is delayed.

Timing diagram 400*b* illustrates a reception of first FSE command (time 401) whereas it is assumed that the reception is followed by executing the first FSE command, a defined time frame (410) from the reception of the first FSE command, a completion of the execution of the first FSE command (time 403), an absence of reception of the second FSE command before the termination of the defined time frame and the release of the lock (time 406).

Timing diagram 400*c* illustrates a reception of first FSE command (time 401) whereas it is assumed that the reception is followed by executing the first FSE command, a defined time frame (410) from the reception of the first FSE command, a completion of the execution of the first FSE command (time 403), a reception of a second FSE command (time 404) before the termination of the defined time frame whereas it is assumed that the reception is followed by executing the second FSE command, another defined time frame (411) from the reception of the second FSE command, a completion of the execution of the second FSE command (time 405), a reception of a third FSE command (time 407) before the termination of the other defined time frame whereas it is assumed that the reception is followed by executing the third FSE command. There may be more additional FSE commands that follow the third FSE command.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

I claim:

1. A method for locking metadata, the method comprises:
   executing a first file system entity (FSE) command, wherein the executing of the first FSE command comprises (i) obtaining, by a compute node of a storage system, a lock of FSE metadata that is related to the FSE, wherein the obtaining includes accessing an external lock data structure that is stored at a remote shared storage unit, and (ii) creating and accessing a local version of the FSE metadata;
   estimating, based on a type of the first FSE command, that a reception of the first FSE command will be followed, within a defined time frame, by a reception of a second FSE command of a second type;
   creating in response to the estimating, in a local memory of the compute node, an internal lock metadata that is associated with the FSE and indicates an existence of the lock;
   maintaining the lock following a completion of the first FSE command, wherein the maintaining includes avoiding accessing the external lock data structure for releasing the lock, and keeping the internal lock metadata;
   executing the second FSE command, following the reception of the second FSE command, wherein in a case of detecting existence of the internal lock metadata associated with the FSE, the executing of the second FSE command comprises accessing the local version of the FSE metadata, and in a case of detecting that the internal lock metadata does not exist, the executing of the second FSE command comprises accessing the external lock data structure for obtaining a new lock and reading a remote version of the FSE metadata.

2. The method according to claim 1, comprising releasing the lock following a termination of the defined time frame without a reception of the second FSE command.

3. The method according to claim 1, comprising releasing the lock following a completion of execution of the second FSE command.

4. The method according to claim 1, comprising estimating that the first FSE command will be followed by a reception of additional commands within a defined estimated time period.

5. The method according to claim 4, comprising releasing the lock following a termination of the defined estimated time period without a reception of all of the additional commands.

6. The method according to claim 4, comprising releasing the lock following a defined idle period during which there was no access to the local version of the FSE metadata.

7. The method according to claim 1, wherein the estimating is based on monitoring FSE commands.

8. The method according to claim 1, comprising releasing the lock by a background process.

9. The method according to claim 1, comprising executing the first FSE command by the compute node, and wherein the remote shared storage unit is a storage node of the storage system.

10. The method according to claim 1, wherein in the case of detecting existence of the internal lock metadata associated with the FSE, the executing of the second command comprises avoiding accessing the remote shared storage unit for reading a remote version of the FSE metadata.

11. A non-transitory computer readable medium for locking metadata, the non-transitory computer readable medium stores instructions for:
- executing a first file system entity (FSE) command, wherein the executing of the first FSE command comprises (i) obtaining by a compute node of a storage system, a lock of FSE metadata that is related to the FSE, wherein the obtaining includes accessing an external lock data structure that is stored at a remote shared storage unit, and (ii) creating and accessing a local version of the FSE metadata;
- estimating, based on a type of the first FSE command, that a reception of the first FSE command will be followed, within a defined time frame, by a reception of a second FSE command of a second type;
- creating in response to the estimating, in a local memory of the compute node, an internal lock metadata that is associated with the FSE and indicates an existence of the lock:
- maintaining the lock following a completion of the first FSE command, wherein the maintaining includes avoiding accessing the external lock data structure for releasing the lock, and keeping the internal lock metadata;
- executing the second FSE command, following the reception of the second FSE command, wherein in a case of detecting existence of the internal lock metadata associated with the FSE, the executing of the second FSE command comprises accessing the local version of the FSE metadata, and in a case of detecting that the internal lock metadata does not exist, the executing of the second FSE command comprises accessing the external lock data structure for obtaining a new lock and reading a remote version of the FSE metadata.

12. The non-transitory computer readable medium according to claim 11, that stores instructions for releasing the lock following a termination of the defined time frame without a reception of the second FSE command.

13. The non-transitory computer readable medium according to claim 11, that stores instructions for estimating that the first FSE command will be followed by a reception of additional commands within a defined estimated time period.

14. The non-transitory computer readable medium according to claim 13, that stores instructions for releasing the lock following a termination of the defined estimated time period without a reception of all of the additional commands.

15. The non-transitory computer readable medium according to claim 13, that stores instructions for releasing the lock following a defined idle process during which there was no access to the local version of the FSE metadata.

16. The non-transitory computer readable medium according to claim 11, wherein in the case of detecting existence of the internal lock metadata associated with the FSE, the executing of the second command comprises avoiding accessing the remote shared storage unit for reading a remote version of the FSE metadata.

17. A storage system, having metadata locking capabilities, the storage system comprises:
- a controller that is configured to:
  - execute a first file system entity (FSE) command, wherein the executing of the first FSE command comprises (i) obtaining a lock of FSE metadata that is related to the FSE, wherein the obtaining includes accessing an external lock data structure that is stored at a remote shared storage unit, and (ii) creating and accessing a local version of the FSE metadata;
  - estimate, based on a type of the first FSE command, that a reception of the first FSE command will be followed, within a defined time frame, by a reception of a second FSE command of a second type;
  - create, in a local memory coupled to the controller, an internal lock metadata that is associated with the FSE and indicates an existence of the lock;
  - maintain the lock following a completion of the first FSE command, wherein the maintaining includes avoiding accessing the external lock data structure for releasing the lock, and keeping the internal lock metadata; and
  - execute the second FSE command, following the reception of the second FSE command, wherein in a case of detecting existence of the internal lock metadata associated with the FSE, the executing of the second FSE command comprises accessing the local version of the FSE metadata, and in a case of detecting that the internal lock metadata does not exist, the executing of the second FSE command comprises accessing the external lock data structure for obtaining a new lock and reading a remote version of the FSE metadata.

* * * * *